(12) United States Patent
Bruder et al.

(10) Patent No.: US 9,186,967 B2
(45) Date of Patent: Nov. 17, 2015

(54) KINEMATICS FOR A CLOSURE

(71) Applicant: MAGNA Car Top Systems GmbH, Bietigheim-Bissingen (DE)

(72) Inventors: Gernot Bruder, Karlsruhe (DE); Metodi Kostadinov, Stuttgart (DE); Artur Mangold, Sulz-Mühlheim (DE)

(73) Assignee: MAGNA Car Top Systems GmbH, Bietigheim-Bissingen (DE)

( * ) Notice: Subject to any disclaimer, the term of this patent is extended or adjusted under 35 U.S.C. 154(b) by 141 days.

(21) Appl. No.: 14/027,291

(22) Filed: Sep. 16, 2013

(65) Prior Publication Data

US 2014/0075845 A1    Mar. 20, 2014

(30) Foreign Application Priority Data

Sep. 14, 2012   (DE) .......................... 10 2012 216 427

(51) Int. Cl.
*B60J 7/06*    (2006.01)
*B60J 7/185*   (2006.01)

(52) U.S. Cl.
CPC ............... *B60J 7/064* (2013.01); *B60J 7/1855* (2013.01)

(58) Field of Classification Search
CPC ............. B60J 7/08; B60J 7/12; B60J 7/1204; B60J 7/14; B60J 7/143; B60J 7/145; B60J 7/185; B60J 7/1855; B60J 7/1856; B60J 2007/08; B60J 2007/12; B60J 2007/1204; B60J 2007/1208; B60J 2007/1221; B60J 7/064; E05F 11/08; E05F 11/12; E05F 11/16; E05F 11/22; E05F 11/24; E05F 11/28; E05F 15/02; E05F 15/025
See application file for complete search history.

(56) References Cited

U.S. PATENT DOCUMENTS

| | | | |
|---|---|---|---|
| 6,595,574 B2 * | 7/2003 | Shaw et al. | 296/120.1 |
| 6,729,672 B2 * | 5/2004 | Neubrand | 296/107.07 |
| 6,837,535 B2 * | 1/2005 | Plesternings | 296/121 |
| 7,309,099 B2 * | 12/2007 | Netzel et al. | 296/108 |
| 8,424,952 B2 * | 4/2013 | Schmitt | 296/136.05 |
| 8,474,899 B2 * | 7/2013 | Moran et al. | 296/100.18 |
| 2003/0080580 A1 * | 5/2003 | Obendiek | 296/107.17 |
| 2010/0066117 A1 * | 3/2010 | Schmitt | 296/107.08 |

FOREIGN PATENT DOCUMENTS

DE  10 2004 018 905 A1   11/2005
DE  10 2009 048 959 A1    4/2011

* cited by examiner

*Primary Examiner* — Katherine Mitchell
*Assistant Examiner* — Catherine A Kelly
(74) *Attorney, Agent, or Firm* — Jordan IP Law, LLC; Todd A. Vaughn

(57) ABSTRACT

Apparatus configured to open, close, unlock and lock a flap of a motor vehicle. A drive link of a kinematic drive mechanism is configured to act on a kinematic flap mechanism, in which a deflecting lever of the kinematic actuating mechanism is drivable by an actuator and, during a closing movement, engages in an engagement element of the kinematic flap mechanism or of the flap and, in the process, closes and locks the flap.

20 Claims, 7 Drawing Sheets

KINEMATICS FOR A CLOSURE

CROSS-REFERENCE TO RELATED APPLICATIONS

The present application claims priority under 35 U.S.C. §119 to German Patent Application No. DE 10 2012 216 427.8 (filed on Sep. 14, 2012), which is hereby incorporated by reference in its entirety.

TECHNICAL FIELD

Embodiments are directed to an arrangement of a flap of a motor vehicle, in particular, a folding-top compartment cover.

BACKGROUND

A folding-top compartment cover is disclosed in European Patent Publication EP 1318041 B1, and includes a first slider which moves to and fro and actuates a locking mechanism in order to unlock or lock the vehicle flap, and a second slider which is movable to and fro in the first slider and is coupled directly or indirectly to the vehicle flap for opening and closing the vehicle flap. In this case, at least the main direction of movement of the first slider and of the second slider is preferably substantially parallel. Use is made of at least two sliders which have to be guided in guide rails or the like. Such sliders are driven via driving cables, gearwheels and/or racks, belts, links and the like.

SUMMARY

Embodiments are related to a folding-top compartment cover having an enhanced design which with substantially fewer components, less complexity and increased reliability.

Embodiments are related to a folding-top compartment cover configured to open, close, unlock and lock a vehicle flap, in which a drive link of a kinematic drive mechanism acts on a kinematic flap mechanism, a deflecting lever of the kinematic actuating mechanism is drivable by an actuator and, during a closing movement, engages in an engagement element of the kinematic flap mechanism or of the vehicle flap and, in the process, closes and locks the latter.

An actuating system has hitherto been required in each case for the opening and closing and also for the locking and unlocking of a vehicle flap. The effect achieved by the kinematic drive mechanism acting on the kinematic flap mechanism is that the vehicle flap may be simultaneously opened, closed, unlocked and locked with only one actuating system and, with a simultaneous reduction in components otherwise required, the reliability of the movement sequence may be increased, wherein, owing to the design of the arrangement, the friction in the system is substantially reduced and the transmission of the forces is ensured in every working position.

The arrangement in accordance with embodiments includes a vehicle flap and a multi-bar system which comprises a kinematic actuating mechanism and a kinematic flap mechanism. The arrangement also has a locking mechanism and an actuating system for driving the kinematic actuating mechanism which actuates the kinematic flap mechanism.

In accordance with embodiments, opening, closing, unlocking and locking take place via a multi-bar system, such as, for example, a four-bar system. This system makes it possible in a simple manner to use a synchronous operation of the kinematic drive mechanism for, for example, closing and locking and unlocking and opening a vehicle flap.

In accordance with embodiments, the kinematic drive mechanism may be actuated by a drive cylinder. The drive cylinder may be actuated here electrically, pneumatically or hydraulically. However, it is also conceivable for the actuation to take place mechanically.

In accordance with embodiments, the vehicle flap comprises a locking mechanism that includes an engagement element and a mating engagement element which is operatively connected and/or interacts with the engagement element.

In accordance with embodiments, the engagement element is operatively connected directly to a vehicle folding-top flap or a kinematic flap mechanism, and the mating engagement element is operatively connected directly to a deflecting lever which is rotatable by the actuating system.

In accordance with embodiments, alternatively, the mating engagement element may also be formed integrally with the deflecting lever.

In accordance with embodiments, the engagement element may comprise, for example, a hook, a cam, a spring element or a pin.

The mating engagement element is designed in a manner corresponding to the engagement element such that interaction as a locking mechanism is ensured.

In accordance with embodiments, the multi-bar system is bringable into a first functional position, in which the locking mechanism locks the vehicle flap when the multi-bar system reaches the position beyond the dead centre, and into a second functional position, in which the vehicle flap is open. By reaching the position beyond the dead centre, additional locking of the vehicle flap takes place. As a result, high sealing forces are realized even with a relatively weak drive.

In accordance with embodiments, the arrangement has a mechanical stop on which the engagement element and the deflecting lever are supported in the closed state of the vehicle flap. As a result and owing to the position of the multi-bar system beyond the dead centre, permanent forces do not have to be applied by the drive cylinder in order to maintain the locking state.

In accordance with embodiments, it may be conceivable that, as an alternative to a position of the multi-bar system beyond the dead centre, the actuating system may be blocked and therefore, having a self-locking effect on the multi-bar system.

In accordance with embodiments, the kinematic drive mechanism may be actuable via a drive cylinder. The drive cylinder here may be driven electrically, pneumatically or hydraulically.

In accordance with embodiments, the deflecting lever is driven directly by the actuating system, as a result of which a simpler construction of the kinematic drive mechanism may be realized.

In accordance with embodiments, the vehicle flap has a defined pivot point on the body. The pivot point serves for mounting the vehicle flap and for absorbing and transmitting the forces occurring and acting on the vehicle flap to the body. Such forces occur, for example, during opening and closing of the vehicle flap. However, other forces, for example, the relative wind, also act on the vehicle flap.

In accordance with embodiments, the arrangement comprises a locking mechanism, wherein the locking mechanism includes an engagement element and a mating engagement element interacting with the latter, wherein the engagement element may be designed as a hook and the mating engagement element may be designed as a pin.

In accordance with embodiments, during the opening of the vehicle flap, when the mating engagement element is rotated by the rotatable deflecting lever, the mating engagement element is released from the engagement element. The mating engagement element here is arranged on the deflecting lever and is rotatable about a common pivot point. Owing to the position of the multi-bar system, which is achieved between the drive lever and the deflecting lever, beyond the dead centre, the vehicle flap is initially moved in the opposite opening direction, thus minimizing the contact force between the mating engagement element and the engagement element and facilitating the unlocking of the arrangement, since the mating engagement element and the engagement element are movable in an opposed direction. Load-free and frictionless locking and unlocking ideally take place.

In accordance with embodiments, the arrangement has a region which is defined for the catching of the engagement element by the mating engagement element during the locking of the vehicle flap. This region permits the engagement element to be reliably caught by the mating engagement element, even in the event of tolerance errors, and to be brought into a locking position.

In accordance with embodiments, a minimum length for an effective lever for closing the vehicle flap is defined. A correspondingly large lever arm ensures reliable closing of the vehicle flap even if the actuating forces of the drive are low.

In accordance with embodiments, an apparatus configured to open, close, unlock and lock a flap of a motor vehicle includes at least one of: a kinematic flap mechanism including a crank link connected to a link; a kinematic actuating mechanism including a drive link operatively connected to the crank link to actuate the kinematic flap mechanism, and a deflecting lever on which a mating engagement element is arranged; and an actuating system operatively connected to the deflecting lever to drive the kinematic actuating mechanism.

In accordance with embodiments, a multi-bar system for a motor vehicle includes at least one of: a kinematic flap mechanism including a crank link connected to a link; a kinematic actuating mechanism including a drive link operatively connected to the crank link to actuate the kinematic flap mechanism, and a deflecting lever on which a mating engagement element is arranged; a locking mechanism having an engagement element and a mating engagement element operatively connected to the deflecting lever; and an actuating system operatively connected to the deflecting lever to drive the kinematic actuating mechanism.

DRAWINGS

Embodiments are illustrated in the drawings and are explained in more detail in the description below:

DESCRIPTION

Figure 1:
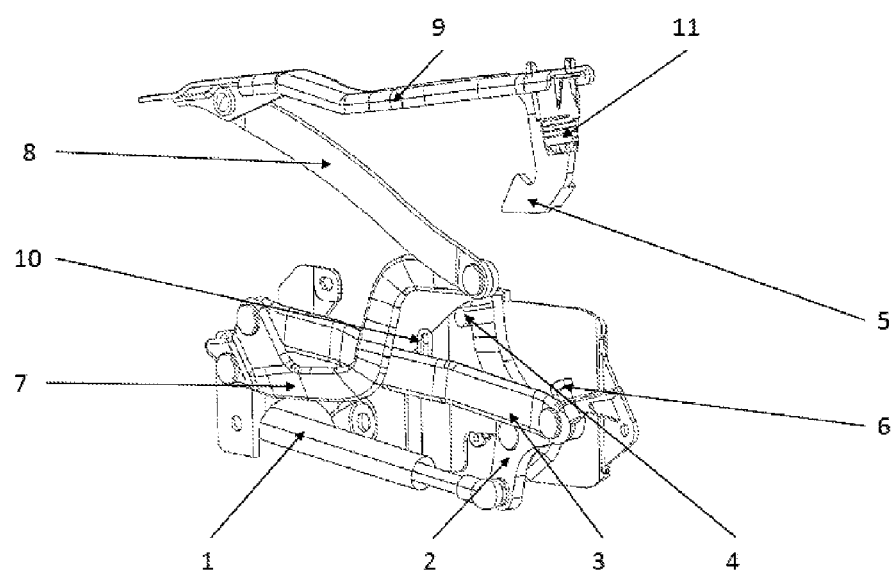
FIG. 1 illustrates a perspective view of the arrangement, in accordance with the embodiments.

FIG. 1 illustrates a perspective view of an arrangement, the arrangement including a vehicle flap (not illustrated) and a multi-bar system which has a kinematic actuating mechanism and a kinematic flap mechanism. The arrangement also includes a locking mechanism and an actuating system 1 for driving the kinematic actuating mechanism.

The kinematic actuating mechanism includes of the deflecting lever 2, on which a mating engagement element 4 is arranged, and a drive link 3. The kinematic flap mechanism comprises a crank link 7, a link 8 and a further link (not illustrated) which is fastened to the bearing point LP.

The drive link 3 is connected to the crank link 7, as a result of which the kinematic drive mechanism may actuate the kinematic flap mechanism.

The actuating system 1 has a drive cylinder, which is operatively connected directly to the deflecting lever 2, and which rotates the deflecting lever 2 about a pivot point DP (not illustrated in FIG. 1) upon actuation. A mating engagement element 4 is fastened or formed on the deflecting lever 2. When the drive cylinder 1 is actuated, a drive link 3 which is operatively connected to the deflecting lever 2 is moved by the deflecting lever 2 in a manner corresponding to the direction of movement of the drive cylinder 1. The deflecting lever 2 here is in a position beyond the dead centre with respect to the drive link 3. The kinematic drive mechanism is locked, since the deflecting lever 2 is supported on a mechanical stop 6 in the opening direction of the kinematic mechanism. The drive link 3, which is furthermore operatively connected to a crank 7, is forcibly guided in a console in a guide track 10. The crank 7 is coupled to a link 8 which, in turn, is connected to a vehicle flap receptacle 9. An engagement element 5 and a rubber element 11 are integrated in the vehicle flap receptacle 9. The vehicle flap is connected to the vehicle flap receptacle 9. Owing to the construction of the system, a vehicle flap may be opened and closed and also locked and unlocked in a simple manner with only one kinematic drive mechanism.

Figure 2:
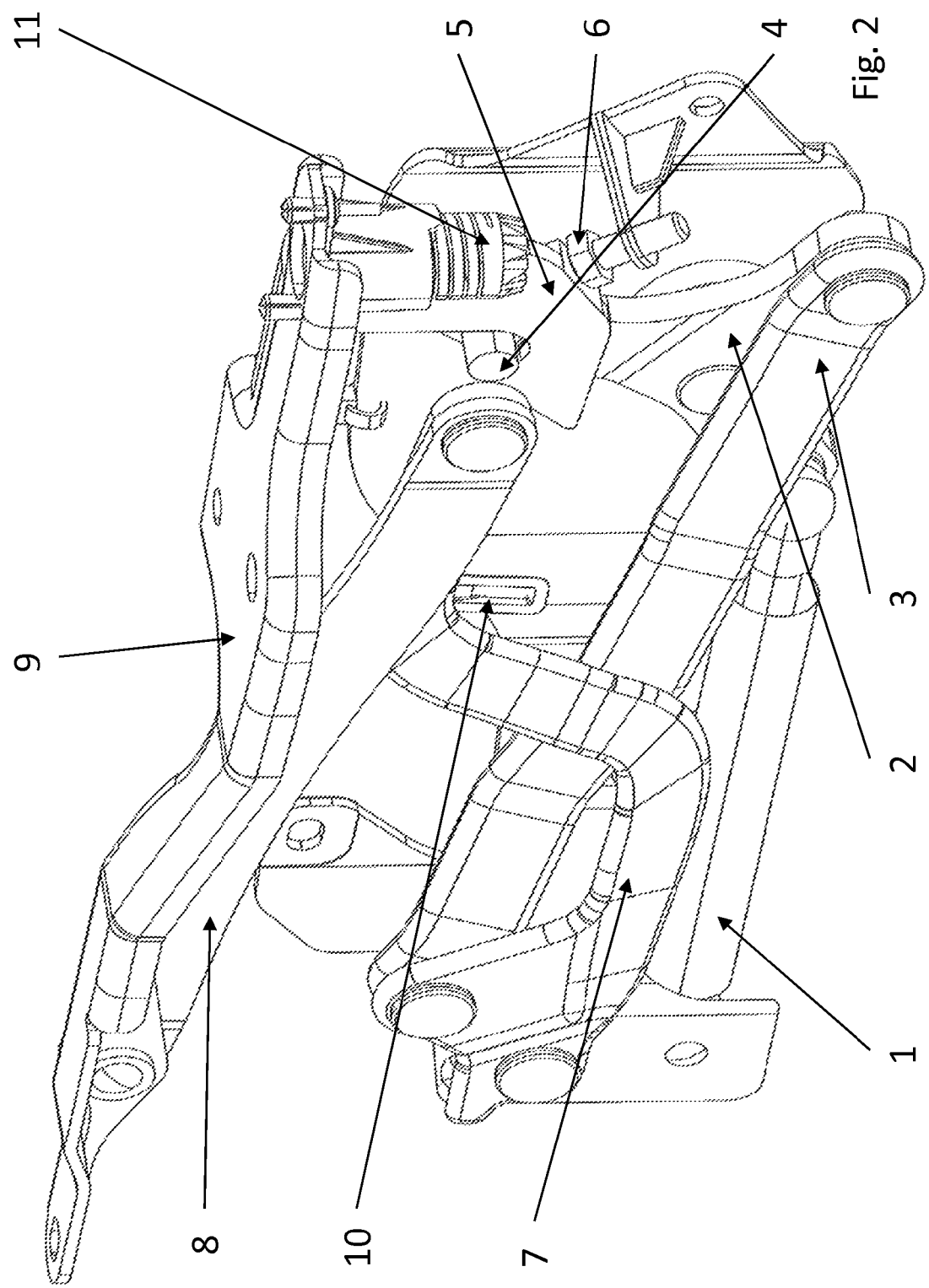
FIG. 2 illustrates a perspective view of the arrangement in a locked state, in accordance with the embodiments.

FIG. 2 illustrates a perspective view, in which the arrangement is illustrated in a closed state. The engagement element 5 is in engagement with the mating engagement element 4 in a position beyond a dead centre. This prevents the locking mechanism from being released by way of vibrations and shaking. A mechanical stop 6 prevents further deflection of the system ("overpushing"), and the engagement element 5 and the deflecting lever 2 are supported in the closed state on the mechanical stop 6, and therefore, permanent forces do not have to be applied by the drive cylinder 1 in order to maintain the locking state. A rubber element 11 is provided and configured to damp and prevent the production of noise during the closing of the vehicle flap.

Figure 3:
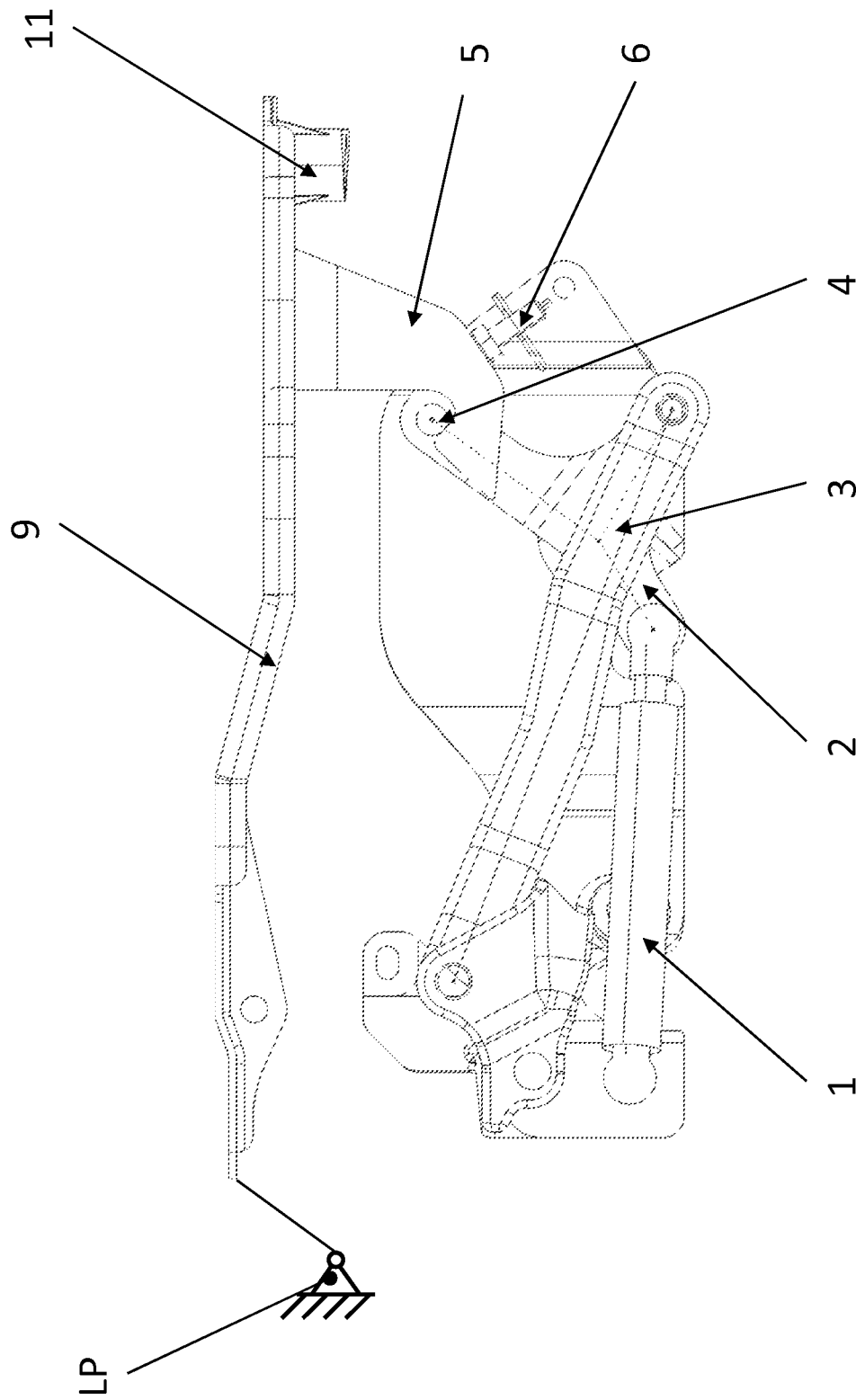
FIG. 3 illustrates a side view of the arrangement of FIG. 2, in accordance with the embodiments.

FIG. 3 illustrates a side view of the arrangement described in FIG. 2. The connection of the arrangement to a body (not illustrated) via the bearing point LP is illustrated schematically.

Figure 4:
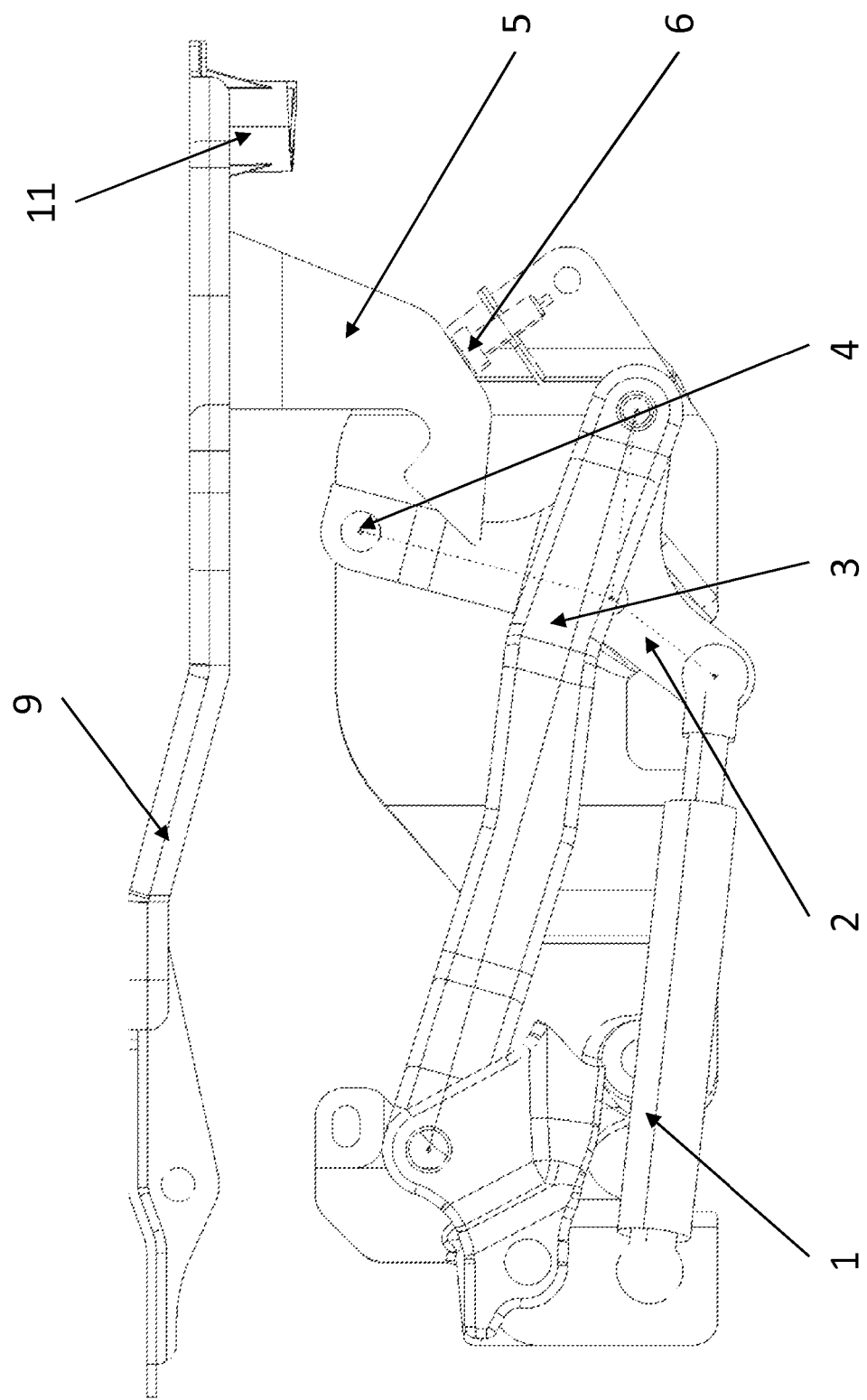
FIG. 4 illustrates a side view of the arrangement in an unlocked state, in accordance with the embodiments.

FIG. 4 illustrates a view of the arrangement in the unlocked state. The mating engagement element 4 is released from the engagement element 5. When the drive cylinder 1 is actuated further, the vehicle flap is brought into an open state. The crank 7 and the link 8 are not illustrated for the sake of better clarity.

Figure 5:
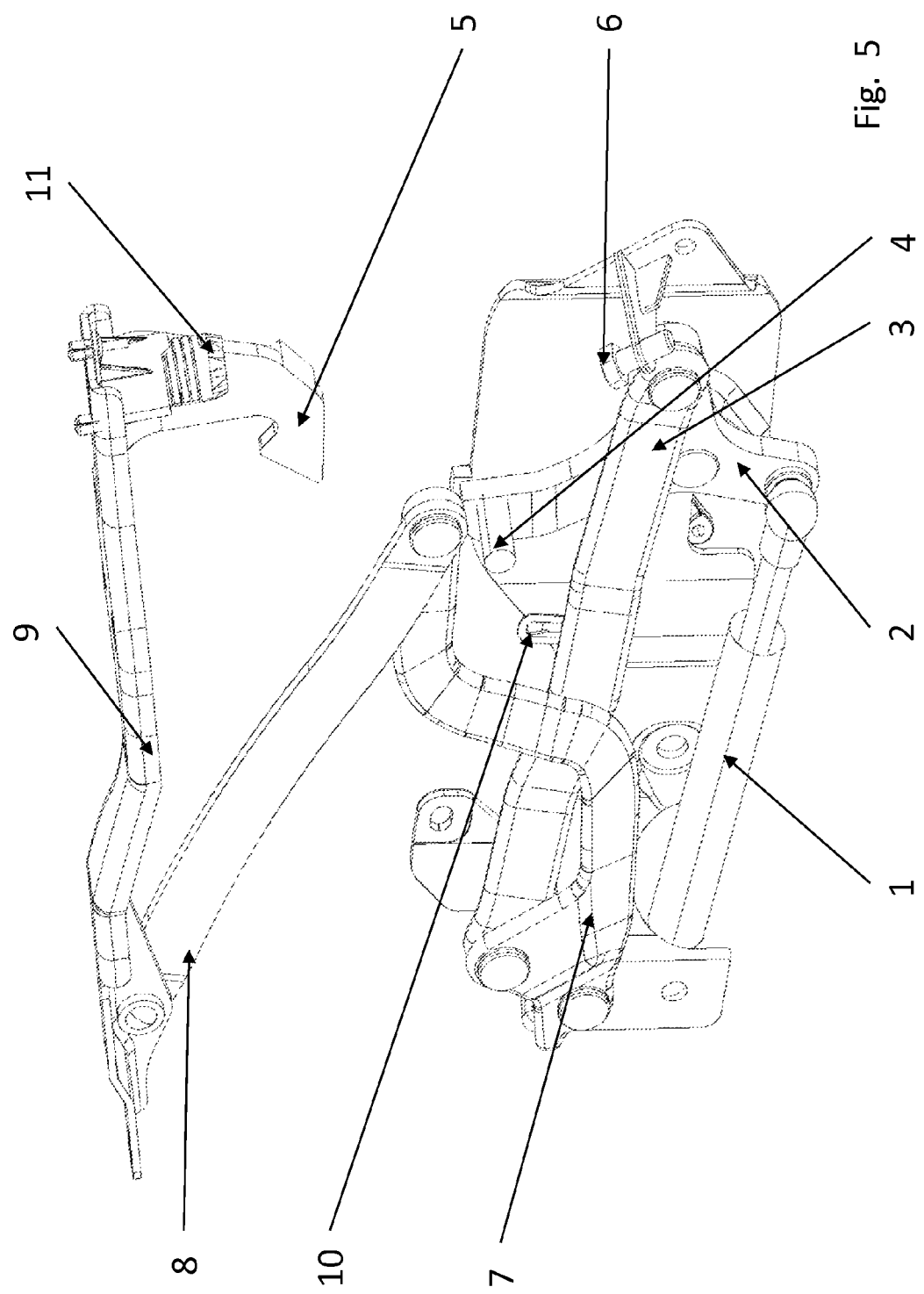
FIG. 5 illustrates a perspective view of the arrangement in an intermediate position, in accordance with the embodiments.

An intermediate position of the arrangement is illustrated in a perspective view in FIG. 5. In accordance with embodiments, the vehicle flap is unlocked and locked and also opened and closed rapidly and reliably by way of a kinematic drive mechanism.

Figure 6:
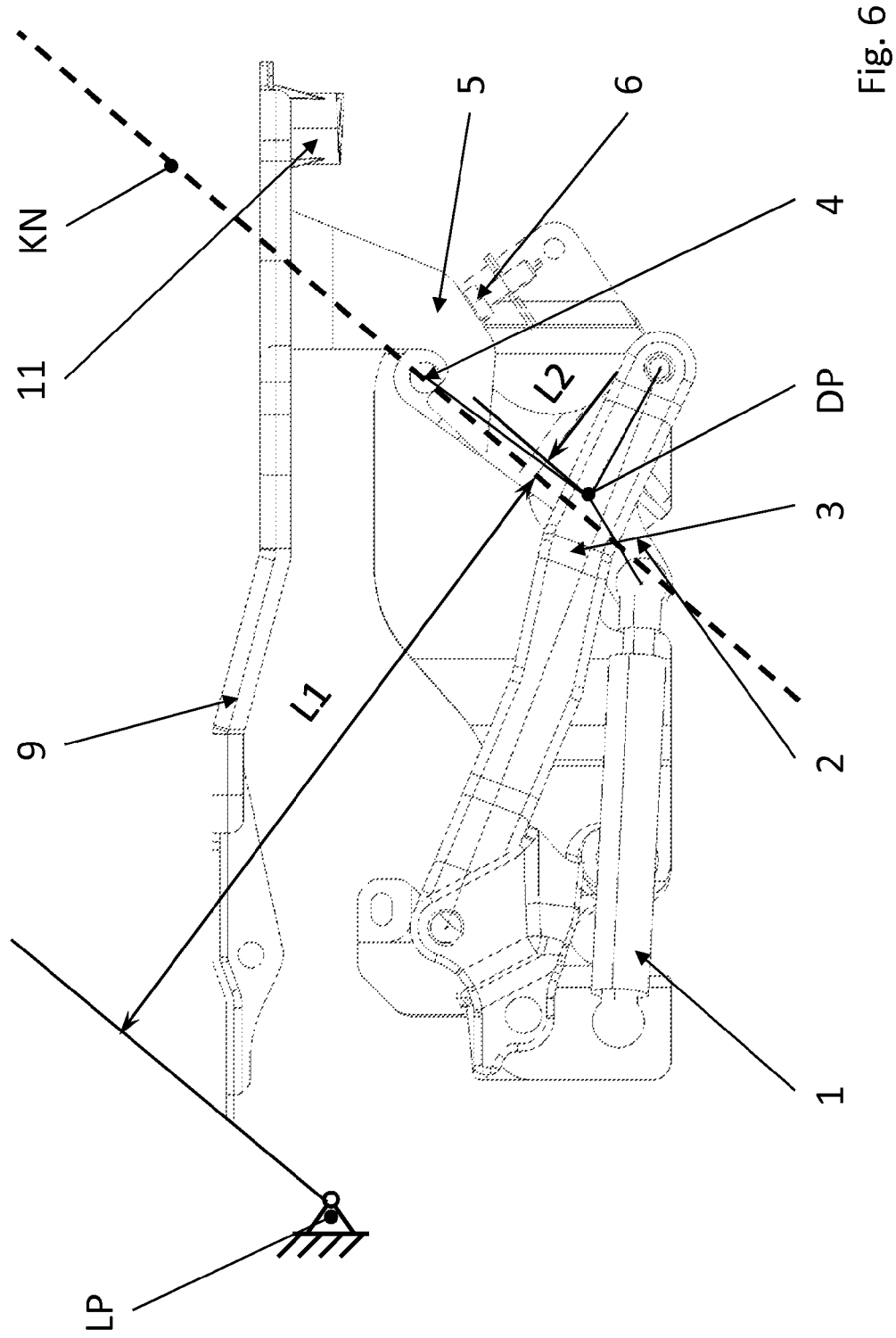
FIG. 6 illustrates a side view with an illustration of the lever arm ratios, in accordance with the embodiments.

FIG. 6 illustrates that a large lever arm L1 acts on the body between the contact normal KN and the bearing point LP during the closing of a vehicle flap (not illustrated). As a result, relatively small closing forces are required for closing the vehicle flap. The distance L2 of the contact normal KN from the pivot point DP enables the locking mechanism to reach a position beyond the dead centre, and therefore no further forces are required for maintaining the lock.

The deflecting lever 2 here is pivoted by the drive cylinder 1 via the pivot point DP, and therefore, as a further consequence, the mating engagement element 4, which is arranged on the deflecting lever 2, and the drive link 3, the crank 7 and the link 8 and also the vehicle flap receptacle 9 are moved into the closed position in a manner corresponding to the kinematic drive mechanism.

Figure 7:
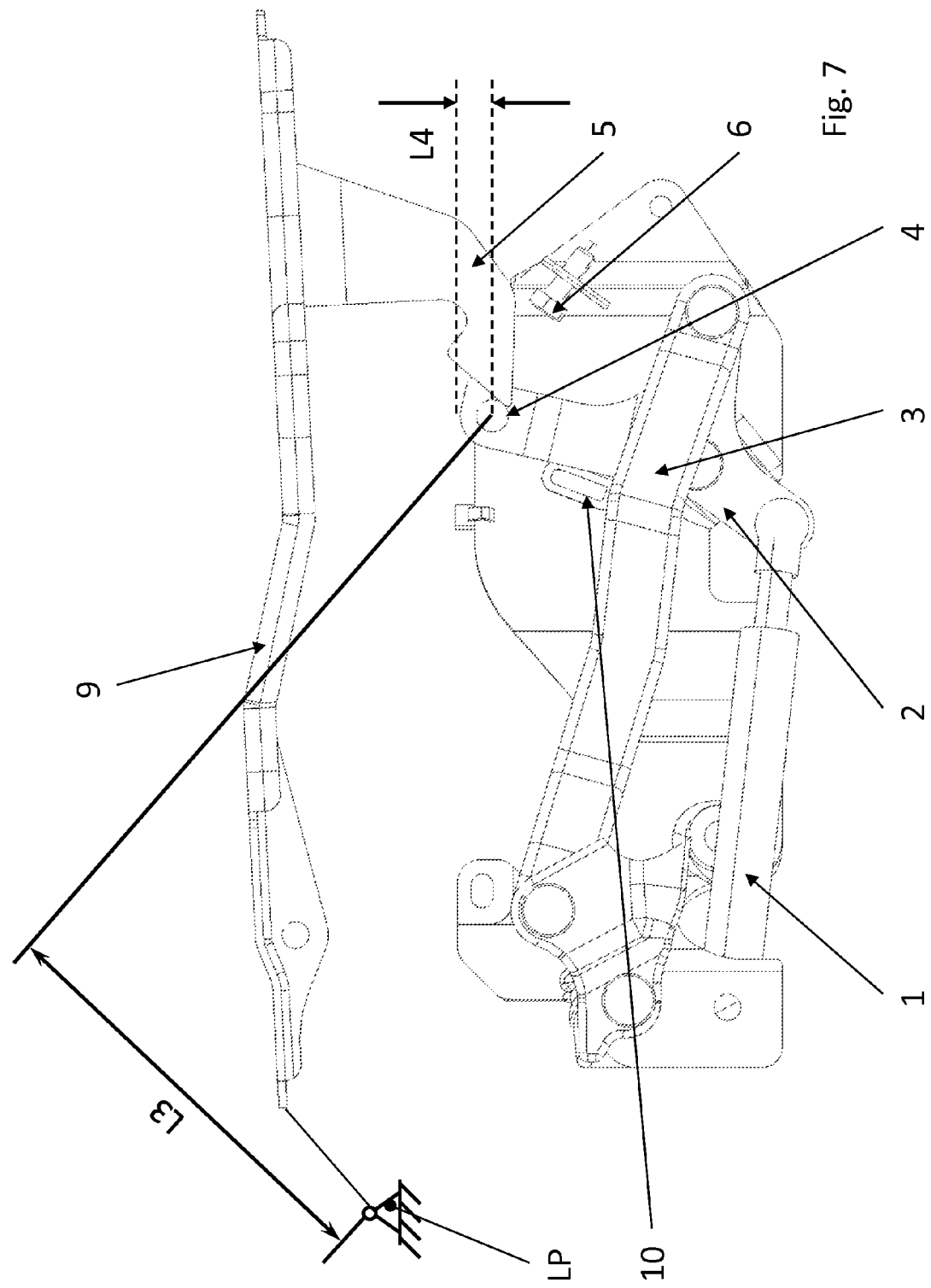
FIG. 7 illustrates a further side view with an illustration of the catch region of the engagement element and the associated lever arm.

The catch region L4 of the engagement element 5 is illustrated in FIG. 7. The vehicle flap remains stationary because of resistances, such as internal friction, the seal and the driving resistance, while the kinematic mechanism moves further. The contact region of the mating engagement element 4 and the engagement element 5 are designed in such a manner that the vehicle flap is pulled shut after the catch region L4, with a lever arm L3 of sufficient size being effective, and therefore small forces are required in order to close the vehicle flap.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS 1 actuator/drive cylinder
2 deflecting lever
3 drive link
4 mating engagement element
5 engagement element
6 stop
7 crank link
8 link
9 vehicle flap receptacle
10 guide track
11 rubber element
LP bearing point
DP pivot point
L1 lever arm
L2 distance
L3 lever arm
L4 catch region
KN contact normal

What is claimed is:

1. An apparatus to open, close, unlock and lock a flap of a motor vehicle, comprising:
   a kinematic flap mechanism having:
      a vehicle flap receptacle which is connected to the flap, and which has a first end and a second end,
      a flap engagement element extending from the second end of the vehicle flap receptacle,
      a link with a first link end connected to the first end of the vehicle flap receptacle, and a second link end, and
      a crank link with a first crank link end, and a second crank link end connected to the second link end, and
   a kinematic actuating mechanism having:
      a deflecting lever which is rotatable about a pivot point, and has a first deflecting lever end, a second deflecting lever end, and a mating engagement element at the second deflecting lever end which is to be directly engaged by the flap engagement element in a closed and locked state of the flap and to be disengaged by the flap engagement element in an open and unlocked state of the flap, and
      a drive link having a first drive link end connected to the first crank link end, and a second drive link end connected to the deflecting lever; and
   an actuating system connected to the first deflecting lever end, and which is to drive the deflecting lever for rotation about the pivot point between a first position which permits the engagement of the flap engagement element and the mating engagement element, and a second position which permits the disengagement of the flap engagement element and the mating engagement element.

2. The apparatus of claim 1, wherein the actuator comprises a drive cylinder.

3. The apparatus of claim 2, wherein the drive cylinder comprises one of a electric drive cylinder, pneumatic drive cylinder and hydraulic drive cylinder.

4. The apparatus of claim 1, further comprising a locking mechanism to place the flap in a locked state.

5. The apparatus of claim 4, wherein the locking mechanism comprises the mating engagement mechanism and the flap engagement element.

6. The apparatus of claim 5, wherein the flap engagement element comprises a hook.

7. The apparatus of claim 6, wherein the mating engagement element comprises a pin.

8. The apparatus of claim 1, wherein rotation of the deflecting lever causes rotation of the mating engagement element.

9. A multi-bar system to open, close, unlock and lock a flap of a motor vehicle, the multi-bar system comprising:
   a kinematic flap mechanism having:
      a vehicle flap receptacle which is connected to the flap, and which has a first end and a second end,
      a flap engagement element extending from the second end of the vehicle flap receptacle,
      a link with a first link end connected to the first end of the vehicle flap receptacle, and a second link end, and
      a crank link with a first crank link end, and a second crank link end connected to the second link end, and
   a kinematic actuating mechanism having:
      a deflecting lever which is rotatable about a pivot point, and has a first deflecting lever end, a second deflecting lever end, and a mating engagement element at the second deflecting lever end which is to be directly engaged by the flap engagement element in a closed and locked state of the flap and to be disengaged by the flap engagement element in an open and unlocked state of the flap, and
      a drive link having a first drive link end connected to the first crank link end, and a second drive link end connected to the deflecting lever; and
   an actuating system connected to the first deflecting lever end, and which is to drive the deflecting lever for rotation between a first position which permits the engagement of the flap engagement element and the mating engagement element, and a second position which permits the disengagement of the flap engagement element and the mating engagement element; and a mechanical stop which is engaged by the flap engagement element in a closed and locked state of the flap, and disengaged by the flap engagement element in an open and unlocked state of the flap.

10. The multi-bar system of claim 9, wherein the actuator comprises a drive cylinder.

11. The multi-bar system of claim 10, wherein the drive cylinder comprises one of a electric drive cylinder, pneumatic drive cylinder and hydraulic drive cylinder.

12. The multi-bar system of claim 9, further comprising a locking mechanism to place the flap in a locked state.

13. The multi-bar system of claim 12, wherein the locking mechanism comprises the mating engagement mechanism and the flap engagement element.

14. The apparatus of claim 13, wherein the flap engagement element comprises a hook.

15. The multi-bar system of claim 14, wherein the mating engagement element comprises a pin.

16. The multi-bar system of claim 9, wherein rotation of the deflecting lever causes rotation of the mating engagement element.

17. A multi-bar system to open, close, unlock and lock a flap of a motor vehicle, the multi-bar system comprising:

a kinematic flap mechanism having:
   a vehicle flap receptacle which is connected to the flap, and which has a first end and a second end,
   a flap engagement element extending from the second end of the vehicle flap receptacle,
   a damping element extending from the second end of the vehicle flap receptacle and adjacent to the flap engagement element;
   a link with a first link end connected to the first end of the vehicle flap receptacle, and a second link end, and
   a crank link with a first crank link end, and a second crank link end connected to the second link end, and
a kinematic actuating mechanism having:
   a deflecting lever which is rotatable about a pivot point, and has a first deflecting lever end, a second deflecting lever end, and a mating engagement element at the second deflecting lever end which is to be directly engaged by the flap engagement element in a closed and locked state of the flap and to be disengaged by the flap engagement element in an open and unlocked state of the flap, and
   a drive link having a first drive link end connected to the first crank link end, and a second drive link end pivotally connected to the deflecting lever; and
an actuating system pivotally connected to the first deflecting lever end, and which is to drive the deflecting lever for rotation between a first position which permits the engagement of the flap engagement element and the mating engagement element, and a second position which permits the disengagement of the flap engagement element and the mating engagement element,
wherein the damp element is to damp and prevent a production of noise during the closing of the flap.

18. The multi-bar system of claim 17, further comprising a mechanical stop which is engaged by the flap engagement element in a closed and locked state of the flap, and disengaged by the flap engagement element in an open and unlocked state of the flap.

19. The multi-bar system of claim 17, further comprising a locking mechanism to place the flap in a locked state.

20. The multi-bar system of claim 18, wherein the locking mechanism comprises the mating engagement mechanism and the flap engagement element.

* * * * *